(12) United States Patent
Johar et al.

(10) Patent No.: US 11,089,308 B1
(45) Date of Patent: Aug. 10, 2021

(54) REMOVING BLOCKING ARTIFACTS IN VIDEO ENCODERS

(71) Applicant: XILINX, INC., San Jose, CA (US)

(72) Inventors: Sumit Johar, Hyderabad (IN); Mahesh Narain Shukla, Hyderabad (IN); Vijay Kumar Bansal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/440,665

(22) Filed: Jun. 13, 2019

(51) Int. Cl.
*H04B 1/66* (2006.01)
*H04N 19/147* (2014.01)
*H04N 19/136* (2014.01)
*H04N 19/107* (2014.01)
*H04N 19/176* (2014.01)
*H04N 19/159* (2014.01)
*H04N 19/124* (2014.01)
*H04N 19/105* (2014.01)

(52) U.S. Cl.
CPC ......... *H04N 19/147* (2014.11); *H04N 19/105* (2014.11); *H04N 19/107* (2014.11); *H04N 19/124* (2014.11); *H04N 19/136* (2014.11); *H04N 19/159* (2014.11); *H04N 19/176* (2014.11)

(58) Field of Classification Search
CPC .. H04N 19/147; H04N 19/105; H04N 19/117; H04N 19/176; H04N 19/51; H04N 19/109; H04N 19/124; H04N 19/139; H04N 19/177
USPC .......................................................... 375/240
See application file for complete search history.

(56) References Cited

U.S. PATENT DOCUMENTS

| | | | |
|---|---|---|---|
| 9,305,362 B1 | 4/2016 | Szedo et al. | |
| 2001/0033619 A1* | 10/2001 | Hanamura | H04N 21/234354 375/240.26 |
| 2016/0261885 A1* | 9/2016 | Li | H04N 19/587 |
| 2019/0087978 A1* | 3/2019 | Tourapis | G06T 9/00 |

OTHER PUBLICATIONS

Title: A Fast Rate-Distortion Optimization Algorithm for H.264/AVC, published on 2007; p. 1157-1160 (Year: 2007).*
Debargha Mukherjee et al., "The latest open-source video codec VP9—An overview and preliminary results," Google, Inc., 987-1-4799-0294-1-1, IEEE, PCS 2013, 4 pages.
Yu-Kuang Tu et al., Efficient Rate-Distortion Estimation for H.264/AVC Codes, IEEE Transactions on Circuits and Systems for Video Technology, vol. 16, No. 5, May 2006, 12 pages.

(Continued)

*Primary Examiner* — Masum Billah
(74) *Attorney, Agent, or Firm* — Patterson + Sheridan, LLP (57) ABSTRACT

A method for video encoding is provided. The method comprises retrieving a first video frame comprising a plurality of pixel blocks; determining a rate distortion optimization (RDO) cost for a first prediction mode for a pixel block; determining a variance-bits ratio (VBR) of the pixel block; upon determining the VBR is greater than a predefined threshold, scaling the RDO cost for the first prediction mode based on a predefined scale factor; and selecting one of the first prediction mode and a second prediction mode for video encoding of the first video frame based on comparing the scaled RDO cost for the first prediction mode and a second RDO cost for the second prediction mode for the pixel block.

20 Claims, 9 Drawing Sheets

(56) References Cited

OTHER PUBLICATIONS

Zhenyu Wei, et al., "A Fast Rate-Distortion Optimization Algorithm for H.264/AVC," Electronic Engineering Department, The Chinese University of Hong Kong, Hong Kong, P.R. China, 1-4244-0728-1, IEEE, ICASSP 2007, 4 pages.

Adrian Grange, et al., VP9 Bitstream & Decoding Process Specification, Version 0.6, Google, Inc., 2016, 171 pages. https://storage.googleapis.com/downloads.webmproject.org/docs/bitstream-specification-v0.6-20160331-ddraft.pdf.

Gisle Bjontegaard, "Calculation of average PSNR differences between RD-Curves," Proceedings of the ITU-T Video Coding Experts Group (VCEG) Thirteenth Meeting, (2001) 4 pages.

\* cited by examiner

REMOVING BLOCKING ARTIFACTS IN VIDEO ENCODERS

TECHNICAL FIELD

Examples of the present disclosure generally relate to video encoding.

BACKGROUND

Global video streaming accounts for around 60% of global online data traffic, and it is predicted that by 2020, video streaming will rise up to 82%. Recently, watching live streaming of video games has become very popular, with dedicated game streaming platforms having millions of subscribers. Video streaming applications are generally bandwidth hungry, and these services have flourished thanks to the improvements in existing network infrastructure, especially mobile data networks, in providing sufficient bandwidths. Recently, demand for newer formats like High Dynamic Range (HDR) and larger display sizes like Ultra High Definition (UHD) has resulted in further increase in demand for more bandwidth, hence putting pressure on existing data networks.

Efficient video compression mitigates the demand for higher bandwidths, especially compression using latest video codecs like VP9, H.264/AVC, and High Efficiency Video Coding (HEVC). With the ever increasing requirements for better quality and larger frame sizes, the video codecs are becoming increasingly complex and computing intensive. VP9 is one such video coding format that has been specially designed to compress larger frames like 1080p and beyond, more efficiently than previous codecs like H.264/AVC. VP9 focuses on meeting today's streaming video requirements and is claimed to provide 30% bitrate savings for a similar picture quality against previously popular video codec H.264/AVC. Recently, AOMedia Video 1 (AV1), a new video coding format succeeding VP9, claims further bitrate savings as compared to VP9. Given the rapid evolution of video codecs in terms of complexity and new feature adoption, implementing encoder IPs like VP9 in data centers for the streaming platforms over field programmable gate arrays (FPGAs) make a very viable use-case. Live streaming of videos requires real-time video encoding capabilities and with the given complexity of today's video codecs that's only possible with dedicated hardware acceleration IPs. However, real-time video encoding for live video streaming can impact visual presentation. That is, current real-time video encoding may introduce visual artifacts into the video image during streaming.

Currently, there is no specific prior-art known which addresses the problem for real-time video encoders using custom low-complexity methods to address visual artifacts (e.g., blocking artifacts) in real-time video streaming. Accordingly, what is needed is a solution for real-time video encoders to address blocking artifacts in video encoders.

SUMMARY

These and other aspects may be understood with reference to the following detailed description. One embodiment is a method for video encoders. The method includes retrieving a first video frame comprising a plurality of pixel blocks; determining a rate distortion optimization (RDO) cost for a first prediction mode for a pixel block; determining a variance-bits ratio (VBR) of the pixel block; upon determining the VBR is greater than a predefined threshold, scaling the RDO cost for the first prediction mode based on a predefined scale factor; and selecting one of the first prediction mode and a second prediction mode for video encoding of the first video frame based on comparing the scaled RDO cost for the first prediction mode and a second RDO cost for the second prediction mode for the pixel block.

Aspects of the present disclosure also provide apparatus, methods, processing systems, and computer readable mediums for performing the method described above.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 7A-L illustrates different graphs of BD-rates from different video graphs, according to embodiments of the present disclosure.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments described herein describe techniques for removing blocking artifacts in video encoding. Such artifacts occur due to the choice of certain modes by the video encoder for blocks having a low bit-budget. Embodiments herein use a pixel blocks' content information, like variance and estimated encoded bits, to favor prediction modes that provide better visual appearance. Embodiments disclosed herein discuss the removal of blocking artifacts in video encoding formats such as VP9; however, the methods discussed are not limited to VP9, and include other types of video encoding formats.

In certain embodiments, the exemplary method for removing blocking artifacts in video encoding has negligible computational complexity in comparison to the complexity of overall video encoder. In certain embodiments, hardware resource-wise, a single multiplexer and a single multiplier can be used to process a complete pixel block.

Figure 1:
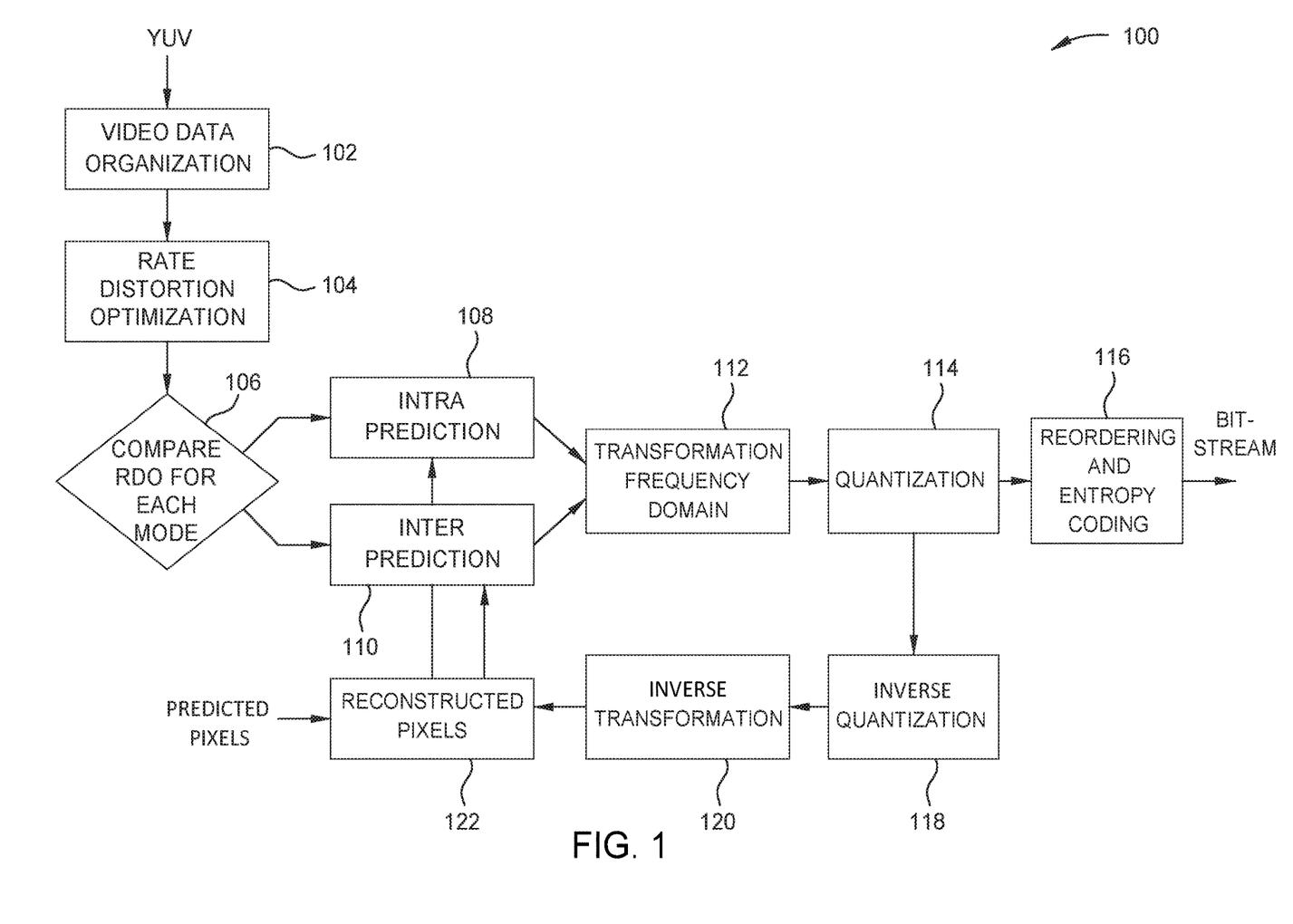
FIG. 1 is a flowchart of video encoding, according to embodiments of the present disclosure.

FIG. 1 is a flowchart 100 of video encoding, according to embodiments of the present disclosure. Again, while the present disclosure is not limited to VP9, VP9 is used herein as an exemplary video encoding format.

VP9 is a block based video coding format and so the video encoder using VP9 takes the raw video data (YUV) and breaks it down to pixel blocks (block 102). The pixel blocks can include any number of pixels and can have any size. In certain embodiments, with a special consideration for larger frames sizes, the video encoder using VP9 supports coding of larger pixel block sizes which are 64×64 pixels (also called Coding Units (CU)). Accordingly, VP9 differs from H.264, which supports maximum block sizes of 16×16 pixel macroblocks. In some embodiments, the video encoder splits the video data into frames, slices, macroblocks, and down to pixel blocks. In certain embodiments, VP9 supports ⅛th pixel motion vector resolution and up to three reference frames. A Superblock can be sub-divided in a quad-tree structure into smaller pixel blocks of up to 8×8 pixels.

Once the video encoder has broken the raw video data into pixel blocks, the video encoder determines the rate distortion optimization (RDO) cost for each pixel block of each frame of the raw video data (block 104). Video encoders use the RDO cost for selection of right combination of prediction modes for encoding the pixel blocks, because different pixel blocks can require different prediction modes. On one side, larger number of coding tools helps to improve the compression efficiency of video codecs, but at the same time it increases the complexity of implementation of encoders. Accordingly, the RDO cost helps in choosing the optimal combination of prediction modes and other coding tools to improve compression efficiency.

In certain embodiments, the RDO cost is based on a Lagrange multiplier method:

$$J=D+\lambda*R$$

where $\lambda$ is a Lagrangian multiplier, D is distortion calculated as the mean of the squared difference between the reconstructed pixels and original pixels, R is the number of bits taken to encode residue coefficients and mode bits, and J is the RDO cost. More details about reconstructed pixels and residue coefficients are provided below.

Based on the RDO cost, the video encoder determines whether which type of prediction it will use within the pixel block (block 106). In certain embodiments, the video encoder chooses the prediction mode with the lowest RDO cost. The video encoder decides between two prediction modes: intra prediction 108 and inter prediction 110. In intra prediction 108 mode, the video encoder uses other pixels from other blocks within a video frame to predict the contents of the pixel block. In inter prediction 110 mode, the video encoder uses pixels from pixel blocks in other video frames to predict the contents of the pixel block. In certain embodiments, the video encoder can use different types of intra prediction 108 modes, and different types of inter prediction 110 modes. VP9 provides 10 intra prediction modes, 8 directional modes along with 2 non-directional modes: DC and True Motion (TM) modes. A few of these intra prediction 108 modes are discussed with reference to FIG. 3b.

In certain embodiments, when the video encoder employs either inter prediction 110 or intra prediction 108, the prediction operation results in residue (also called residual data). The video encoder takes the residue and transforms it into the frequency domain (block 112) using 2-D DCT-like (Discrete Cosine Transform) transform. In some embodiments using VP9, the video encoder supports multiple size DCT-based transform blocks from 4×4 up to 32×32, where the largest transform for a pixel block is limited by the size of that pixel block. In some embodiments, the video encoder has an option to choose between three 8-Tap and a bilinear Motion compensation filters for sub-pixel motion estimation, where these filters are used for generating samples for motion vectors pointing to locations between pixels.

After the video encoder transforms the residue, the video encoder quantizes the coefficients that result from transforming the residue to the frequency domain (block 114). In certain embodiments, lower distortion signifies lesser deviation from the reference frame (i.e., original video frame) to the current frame, thus leading to better quality. In comparison, fewer quantization coefficient bits signify better compression. Quantization of coefficients causes the difference between the reconstructed and original pixels. The video encoder determines the quantization step by the rate control algorithm of the encoder which is a key step for achieving target bitrates in video encoders.

For a pixel block with low bit budget, quantization step size is large which results in division of residue coefficients by large values thereby zeroing of most of the AC coefficients which are generally small in comparison to DC coefficient. Loss of AC coefficients mean low pass filtering of residue data, or flattening of residue data. In such cases, the video encoder predominantly determines the reconstruction of texture variation in that pixel block by the predicted pixels as the video encoder has mostly flattened the residue.

In certain embodiments, after quantization 114, the video encoder entropy-codes the quantized coefficients (block 116). In some embodiments, the video encoder uses VP9 and therefore, employs context-adaptive binary arithmetic coding (CABAC) as an entropy coding scheme.

In certain embodiments, the video encoder comprises an integrated video decoder. In such embodiments, the integrated video decoder decodes the quantized residue. In certain embodiments, the decoder reconstructs the pixels of a video frame by adding the decoded, inverse quantized (block 118), and inverse transformed (block 120) residue to the predicted pixels. Accordingly, in some embodiments, the reconstructed pixels 122 comprise the predicted pixel added with decoded residue (Reconstructed Pixel=Predicted Pixel+Decoded residue). In certain embodiments, the video encoder then has the same data as the decoder for video prediction.

For any real-time encoder, it is practically impossible to generate reconstructed pixels for every mode and also to do complete entropy encoding like CABAC in VP9 to generate actual bits taken. Most real-time encoders, such as a VP9 encoder, use custom RDO methods to reduce the computation cost (e.g., hardware cost). In such scenario, the video encoder measures distortion as a sum of squared differences between the actual and reconstructed transform coefficients (skipping Inverse-DCT) while estimating bits by using cost tables for coefficients and modes (Arithmetic entropy coding process is skipped). This approximation of the RDO cost is helpful in reducing the complexity though, but has an impact on Intra and Inter mode decision leading to problems with visual quality in certain cases. With computer-generated sequences like gaming videos and high motion sequences, the wrong choice of coding mode causes persistent blocking artifacts, which are discontinuities on the block boundaries. The combination of block level transforms and quantization processes causes these blocking artifacts. Further, these artifacts are more prominent when quantization step is higher, especially in low-bitrate scenarios. In certain embodiments, for streaming videos that require a constant bitrate, rate control process determines the quantization step.

Figure 2:
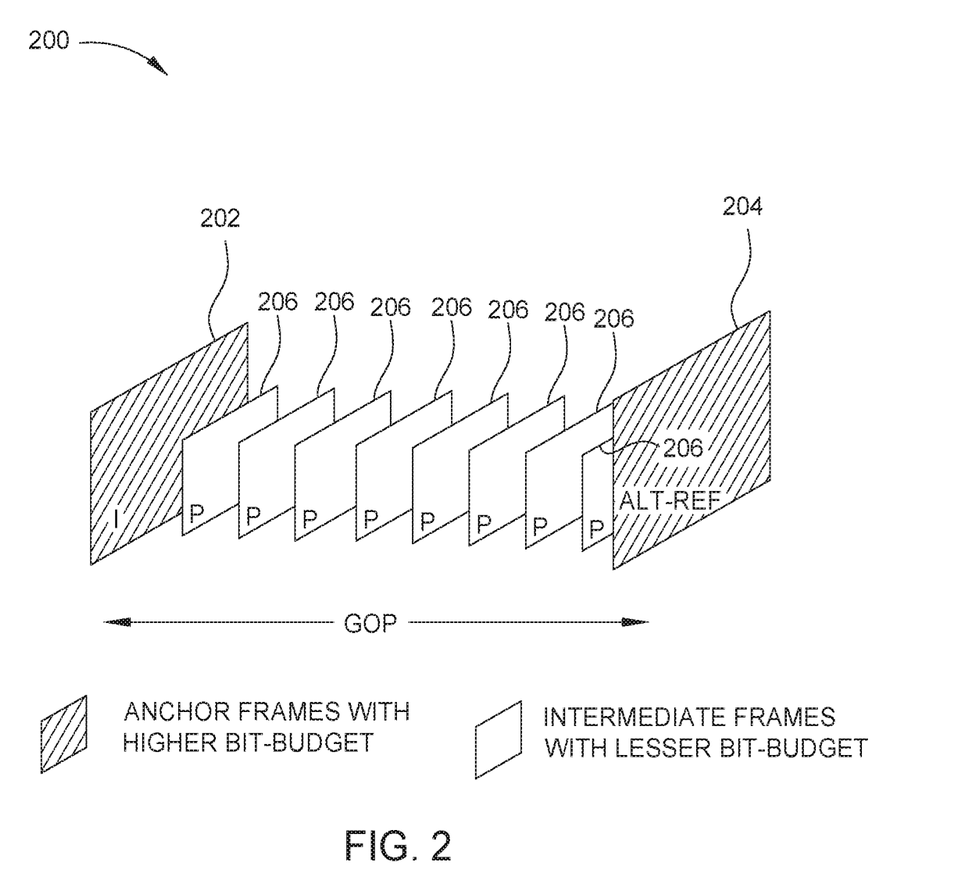
FIG. 2 illustrates video composition using a video encoder, according to embodiments of the present disclosure.

FIG. 2 illustrates video composition using a video encoder after the video encoder breaks the raw video data down to frames as shown in FIG. 1, according to embodiments of the present disclosure. Specifically, FIG. 2 depicts a group of pictures (GOP) 200 forming a portion of a video. In certain embodiments, a GOP 200 is an arrangement of different types of pictures. In certain embodiments using VP9, a GOP 200 consists of two anchor frames (I-frame 202, Alt-Ref frame 204) at the boundary with Inter predicted frames 206 in between. The anchor frames can be I-frame 202, which can be a past reference frame, and Alt-Ref frame 204, which can be a future reference frame.

In some embodiments, the video encoder employs rate control algorithms that determine the structure of the GOP 200, shown in FIG. 2. Rate control is an important block of video encoding because the rate control is responsible for achieving targeted bitrates and for maintaining video quality. Specifically, the video encoder controls how many bits to spend on a given frame.

In certain embodiments, the video encoder uses two-pass encoding (also known as multi-pass encoding) so that the video encoder maintains the quality of the video data during encoding. In the first pass of the two-pass encoding process, the video encoder generates frame-level statistics, such as the percentage of Inter coded pixel blocks, average motion vector costs, bits consumed by each frame etc., to determine the GOP 200 structure and frame-types and also their respective bit-budgets of the video data. These statistics represent the complexity of motion and texture in sequence. In the second pass of the two-pass encoding process, the video encoder uses the frame-level statistics to ensure the quality of the video data during encoding.

In certain embodiments, rate control also determines the quantization step 114 of FIG. 1 for a frame or a pixel block, depending upon the available bit budget, where the bit-budget is determined based on frame type and target bitrate. For a 1920×1080 frame size with 60 frames per second with a target bitrate of 4 Mbps, the average bit budget available per frame is: 4000000/60=66,667 bits. In certain embodiments, the video encoder modifies the budgeting depending upon the frame types. For example, the video encoder gives I-frame 202 and Alt-ref frame 204, which are referenced by multiple frames, higher budgets (greater than 66,667 bits in this case). In comparison, the video encoder gives the frames which are less or not referenced a lower number of bits. In certain embodiments, for a video with very little or no motion, the video encoder places reference frames far apart and gives these reference frames a high bit budget, because slow motion implies very little change between the frames, so many frames can reference a single reference. A good quality reference frames provide better prediction data for rest of the frames thereby improving the overall quality of the GOP.

Figure 3A:
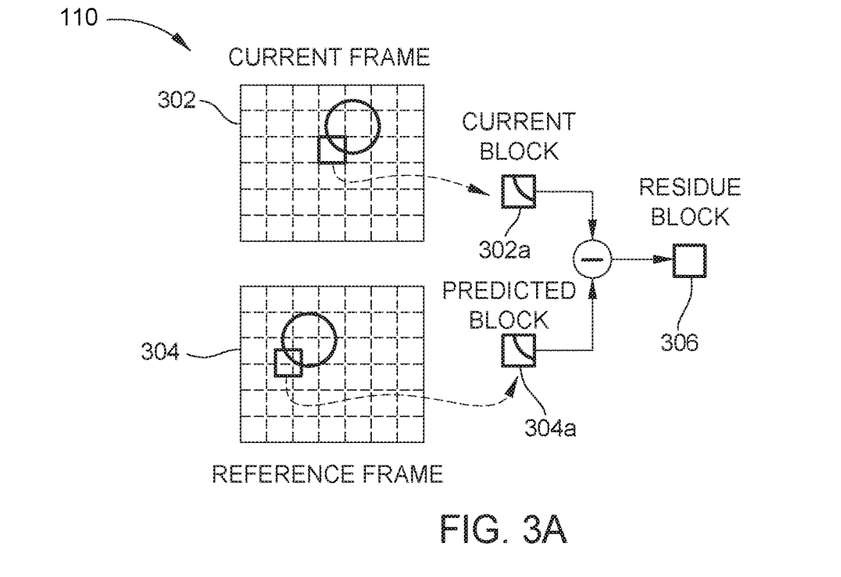
FIG. 3a is an illustration of inter prediction, according to embodiments of the present disclosure.

FIG. 3a is an illustration of inter prediction 110 applied to a frame of the GOP illustrated in FIG. 2, according to embodiments of the present disclosure.

As mentioned previously, when a video encoder uses inter prediction, the video encoder predicts a pixel block from pixels from other frames. In certain embodiments, the video encoder takes a block 302a from the current frame 302 and a block 304a from the reference frame 304. The video encoder calculates the difference between these blocks 302a, 304a and gets the residue block 306.

Figure 3B:
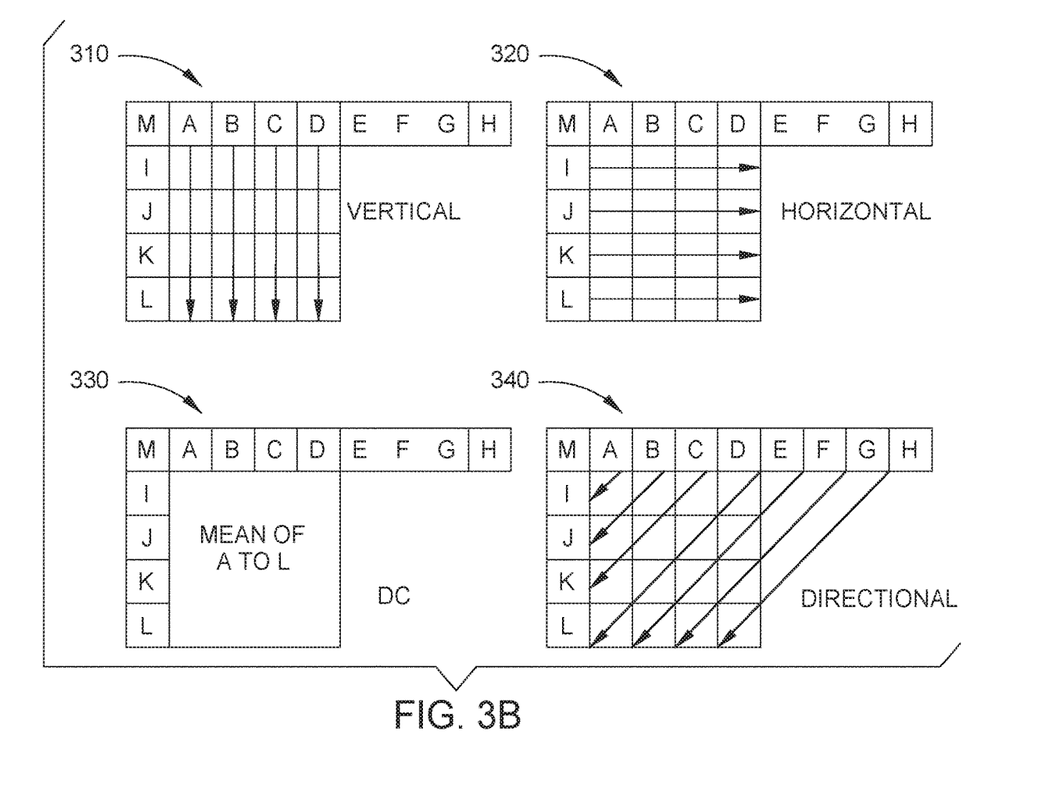
FIG. 3b illustrates different intra prediction modes, according to embodiments of the present disclosure.

FIG. 3b illustrates different intra prediction modes, which can be applied to a frame of the GOP illustrated in FIG. 2 as compared to inter prediction of FIG. 3a, according to embodiments of the present disclosure. As mentioned previously, when a video encoder uses intra prediction, the video encoder predicts a block of pixels from other pixels within the same frame. In some embodiments, intra prediction also uses previously decoded data in a frame.

FIG. 3a illustrates a vertical intra prediction 310, horizontal intra prediction 320, DC intra prediction 330, and directional intra prediction 340. With vertical intra prediction 310, the video encoder extrapolates the contents of a pixel from the vertical neighboring pixels. With horizontal intra prediction 320, the video encoder extrapolates the contents of a pixel from horizontal neighboring pixels. With DC intra prediction 330, the video encoder estimates the DC coefficient of the block, and the DC coefficient is the average of all pixels in a block (e.g., the block formed from A-D by I-L). With directional intra prediction 340, the video encoder performs a planar prediction by generating a linear plane (e.g., arrow from (D,I) to (A,L)) estimated from the neighboring pixels (i.e., extrapolating from neighboring pixels on the same plane).

As shown in FIG. 3b, intra prediction modes use a set of limited boundary pixels from top and left neighboring pixel blocks for prediction. The video encoder extends these boundary pixels as predictors for large numbers of pixels. For example, for a 16×16 pixel block, the video encoder uses only 16 or 17 pixels for directional prediction modes, while for DC and TM Intra modes, the video encoder uses 31 pixels as a predictor for 256 pixels. The repetition of predictors creates a smoothening effect in the direction of prediction, in cases where the prediction data predominantly determines the reconstructed pixels.

Figure 4:
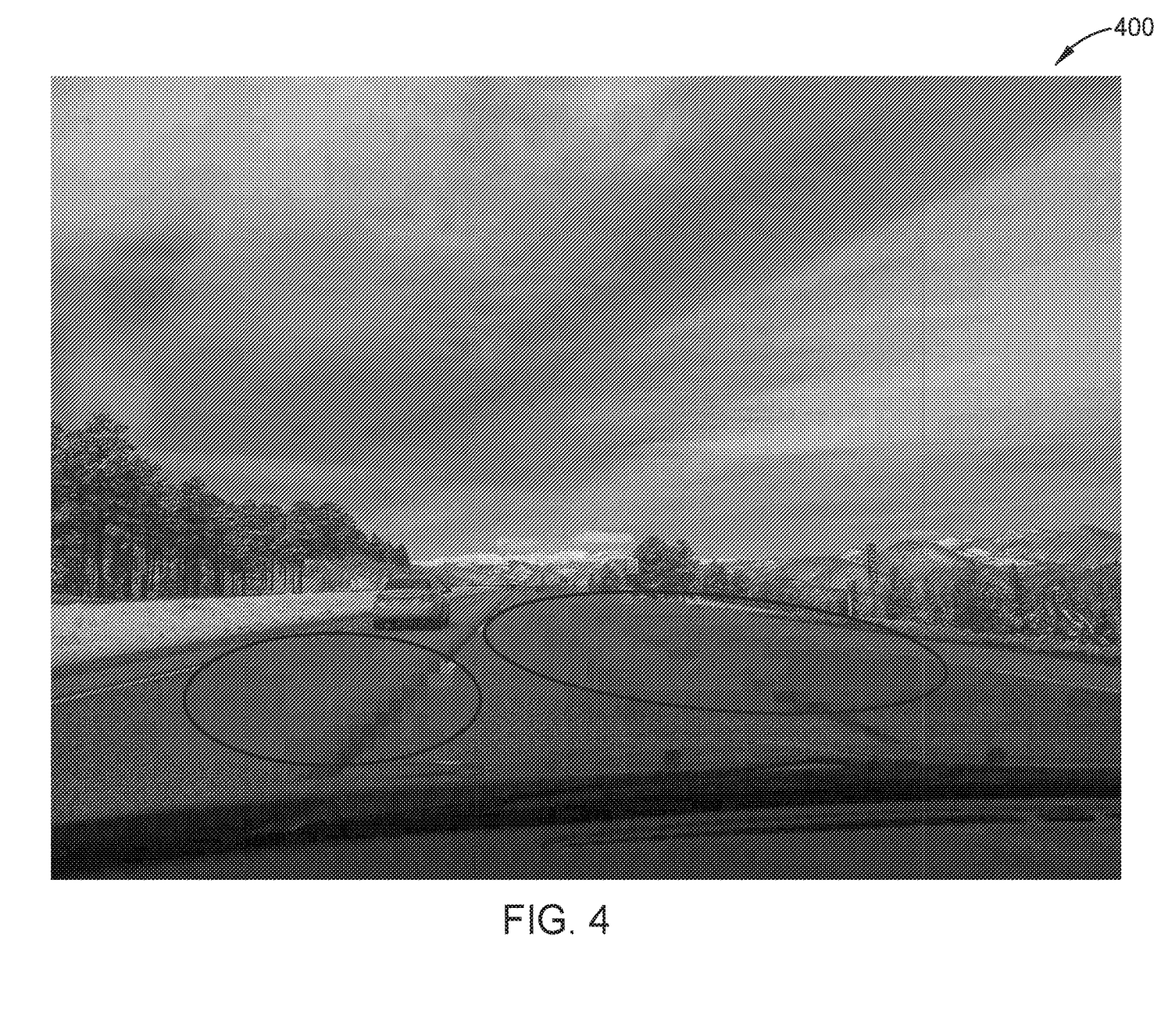
FIG. 4 is a screenshot of a video frame illustrating blocking artifacts, according to embodiments of the present disclosure.

This smoothening of texture in pixel blocks along with the discontinuities at pixel block boundaries (due to transform and quantization) creates blocking artifacts as shown in FIG. 4. Whereas, in Inter prediction the predicted pixels are taken from a block in reference frames, that gives unique predictor for each pixel. For a 16×16 pixel block with 256 pixels, there are 256 different predictors. Blocking artifacts are generally not prominent in I-frames, because in a GOP structure, video encoders assign I-frames much higher bit-budgets in comparison to Alt-Ref or P-frames. When the bit-budget is sufficient, the coded residue coefficients have enough AC components, hence there is enough residual data for reconstruction.

FIG. 4 is a screenshot of a video frame 400 illustrating blocking artifacts as a result of using intra prediction instead of inter prediction as described in FIGS. 3a (showing inter prediction) and 3b (showing intra prediction), according to embodiments of the present disclosure.

As mentioned with respect to FIG. 3b, the smoothening of texture in pixel blocks and discontinuities at pixel block boundaries create blocking artifacts. FIG. 4 illustrates 3 circled areas depicting blocking artifacts. In each circled area of FIG. 4, the image appears blocky because of the discontinuities at pixel block boundaries, while inside the pixel block, the video encoder smoothed out the texture using intra prediction mode.

As described above, the video encoder selects between Inter and Intra prediction modes via the RDO process. Usage of custom RDO methods to reduce complexity impacts the choice of most appropriate mode. With computer-generated sequences, like gaming videos and high motion sequences, video frames persistently had blocking artifacts while encoding with VP9 encoder. The analysis of these video frames revealed that the video encoder used intra mode prediction with low bit budgets on most of the problematic blocks, causing the smoothening of blocks as discussed above.

Accordingly, the issues that occur downstream in the video-encoding process stem from the selection between inter prediction and intra prediction. Consequently, the method disclosed herein acts to remove and prevent blocking artifacts in video encoding.

Figure 5:
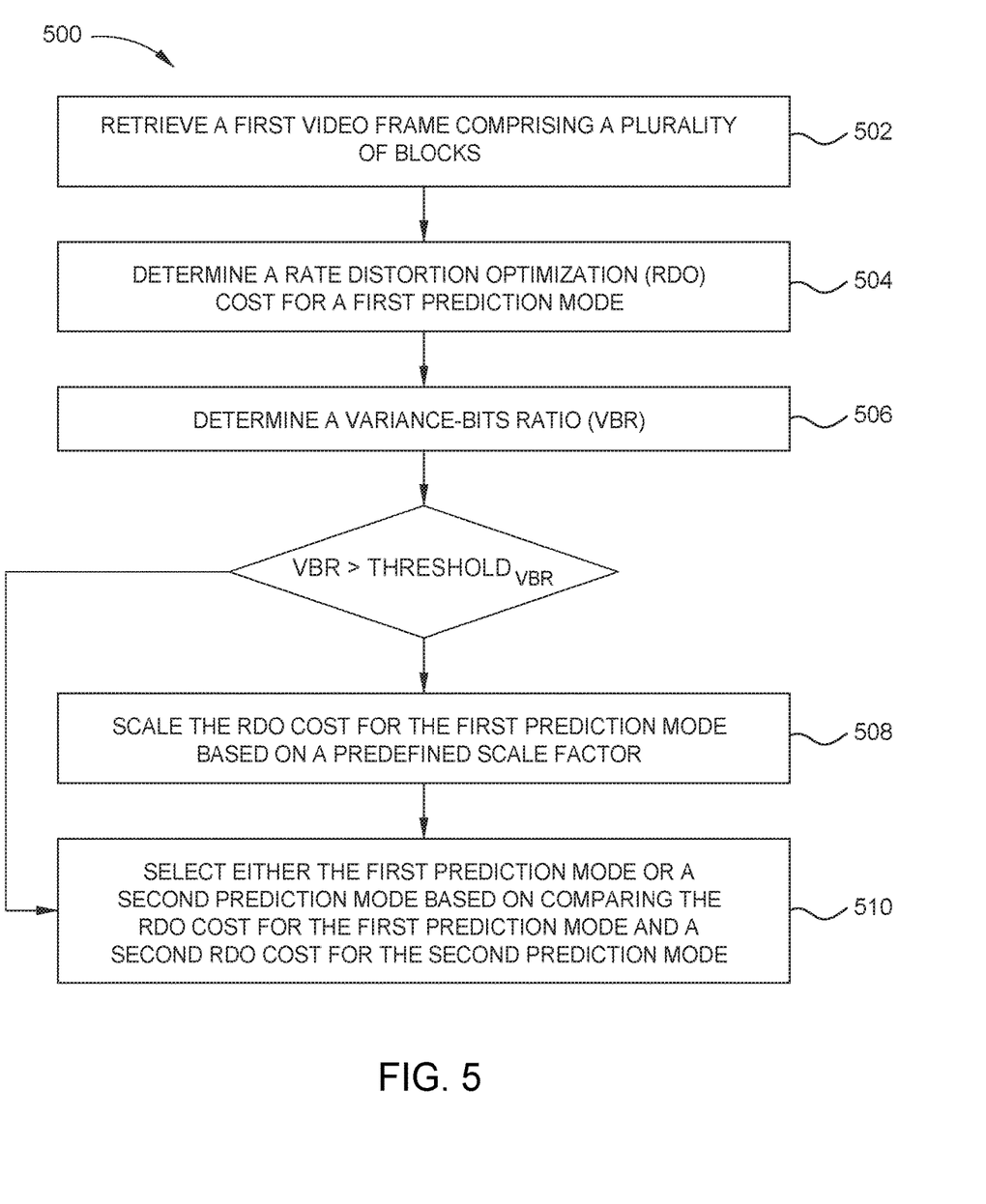
FIG. 5 illustrates example operations performed by a video encoder, according to embodiments of the present disclosure.

FIG. 5 illustrates example operations performed by a video encoder in order to remove the blocking artifacts shown in FIG. 4, according to embodiments of the present disclosure.

In certain embodiments, the method for removing blocking artifacts in video encoding includes retrieving a first video frame having a plurality of pixel blocks. For each pixel block of the first video frame, the video encoder determines that a RDO cost for a video prediction mode, and the video encoder also determines a variance-bits ratio (VBR). Upon determining the VBR is greater than a predefined threshold, the video encoder scales the RDO cost for the video prediction mode based on a predefined scale factor. Once the video encoder has scaled the RDO cost, the video encoder selects either the video prediction mode or another prediction mode based on comparing the scaled RDO cost for the first prediction mode and a second RDO cost for the second prediction mode for the pixel block.

Operations 500 begin, at 502, when the video encoder retrieves a first video frame comprising a plurality of pixel blocks. The video frame can be any type of Inter coded frame like a P-frame, or an Alt-Ref frame, or a B-frame and the video frame can have any number of pixel blocks. Each pixel block can have any number of pixels, and can have any size (i.e., dimension). In certain embodiments, the video encoder is using a block-based video encoding format (e.g., VP9).

At step 504, operations 500 continue with the video encoder determining an RDO cost for a first prediction mode for a pixel block. In certain embodiments, the first prediction mode is intra prediction.

At step 506, operations 500 continue with the video encoder determining a variance-bits ratio (VBR) of the pixel block. In certain embodiments, the VBR is the ratio between the variance of source pixels in a pixel block and bits for coding the pixel block with intra prediction mode. In some embodiments, the video encoder estimated the bits for coding the pixel block when the video encoder calculated the RDO cost for the first prediction mode (e.g., intra prediction mode). A small VBR ratio indicates that the bits allocated for intra prediction mode are enough to efficiently code the pixel block with a given variance. A high VBR ratio indicates that the bits allocated for intra prediction mode are not enough to efficiently code the pixel block with a given variance.

In certain embodiments, blocks having texture but coded with Intra mode and lesser number of bits generally cause such visual artifacts (e.g., blocking artifacts). In such embodiments, visual artifacts occur when displaying texture information in a pixel block. Because texture information requires variance inside and between pixel blocks, the video encoder needs to calculate how much variance is needed in the pixel block to show the texture information and how many bits are required for coding the pixel block. Variance is a measurement of the differences between pixel values (e.g., YUV data) within the pixel block. In some embodiments, the video encoder calculates variance based on the source pixels of the I-frame. In some embodiments, variance represents texture. In some embodiments, bits for coding the pixel block are determined during quantization. With the variance and bits for coding the pixel block, the encoder determines the VBR of the pixel block for intra prediction mode.

At step 508, operations 500 continues with the video encoder scaling the RDO cost for the first prediction mode based on a predefined scale factor upon determining the VBR is greater than the predefined threshold. In certain embodiments, the video encoder determines whether the VBR is greater than a predefined threshold.

In certain embodiments, the predefined threshold is a VBR threshold based on the quantization parameter (QP) for a pixel block, which can be determined by a rate control module. That is, the video encoder uses the QP of the pixel block to determine which VBR threshold to use to compare against the calculated VBR. So, the video encoder uses a pre-defined QP-to-VBR threshold conversion for the comparison against the calculated VBR. Blocks with VBR above the threshold are deemed to have blocking artifacts, and blocks with a VBR below the threshold are deemed to not have blocking artifacts. In some embodiments, the video encoder comprises a predefined look-up table of VBR thresholds based on QP of the pixel block. Table 1 is an example predefined look-up table of VBR thresholds based on QP. The method disclosed herein is not limited to Table 1 and the information included therein.

TABLE 1

| QP to VBR Threshold Conversion | |
|---|---|
| QP | Threshold$_{VBR}$ |
| 0-160 | N/A |
| 160-168 | 1 |
| 169-175 | 1.5 |
| 176-187 | 2 |
| 188-197 | 2.5 |
| 198-204 | 3 |
| 205-208 | 4 |
| 209-211 | 4.5 |
| 212-215 | 5 |
| 216-239 | 6 |
| 240-255 | 7 |

Upon the video encoder determining that the VBR is greater than the predefined threshold, the video encoder applies a predefined scale factor to the RDO cost of the first prediction. In certain embodiments, the video encoder scales D by the predefined scale factor before adding $\lambda*R$ when calculating the RDO cost for applying intra prediction to the pixel block. If the VBR is less than or equal to the predefined threshold, the video encoder does not scale the RDO cost and applies the unmodified Lagrange multiplier method. In certain embodiments, this step can be expressed in the following if-else statements:

if(VBR>Threshold$_{VBR}$)

$J_{INTRA}=D*$scale_factor$+\lambda*R$ else $J_{INTRA}=D+\lambda*R$

In certain embodiments, scale_factor is the predefined scale factor that the video encoder uses to scale the RDO cost. In some embodiments, the predefined scale factor was greater than 1. For example, using gaming sequences, a video encoder used a predefined scale factor of 1.25 to remove the blocking artifacts and without significantly impacting BD-rate (Bjontegaard Delta rate) (0.22% loss only).

At step 510, operations 500 continues with the video encoder selecting one of the first prediction mode and a second prediction mode based on comparing the scaled RDO cost for the prediction mode and a second RDO cost for the second prediction mode for the pixel block. In some embodiments, the second prediction mode is inter prediction. In certain embodiments, the predefined scale factor increases the D, which also increases the RDO cost for the first prediction mode. In some embodiments, the predefined scale factor increases the RDO cost for intra prediction mode, and thereby affects the selection between the intra prediction mode and inter prediction mode.

In certain embodiments, the video encoder modifies the RDO cost to favor Inter prediction modes for visually impacted blocks in P-frames. In certain embodiments, for pixel blocks with VBRs above the predefined threshold, the video encoder amplifies the distortion of Intra prediction mode by artificially scaling the RDO cost for intra mode prediction before the video encoder compares the RDO costs of intra mode prediction and inter mode prediction.

Figure 6A:
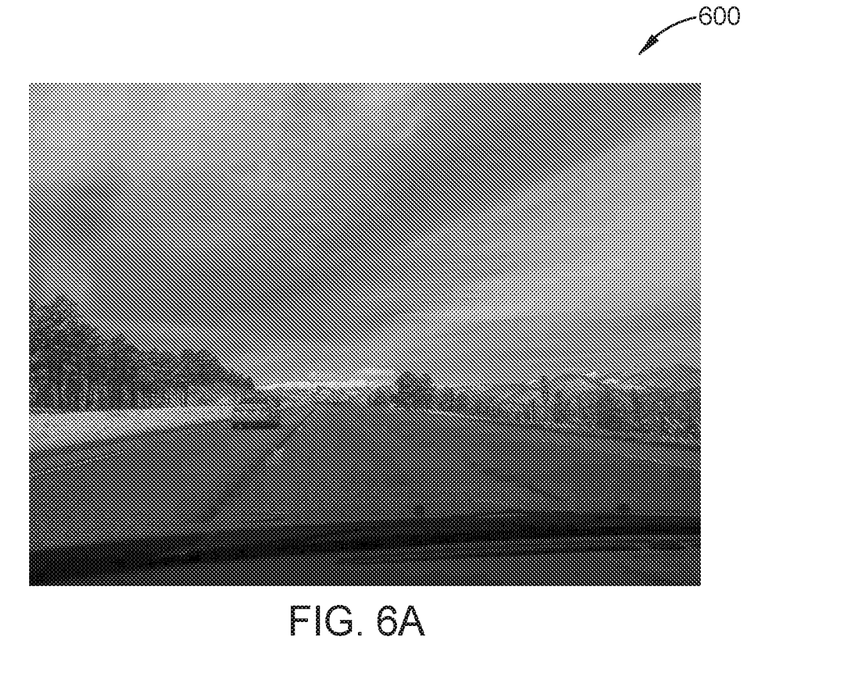
FIGS. 6a and 6b are screenshots of a video frame with and without blocking artifacts, according to embodiments of the present disclosure.
Figure 6B:
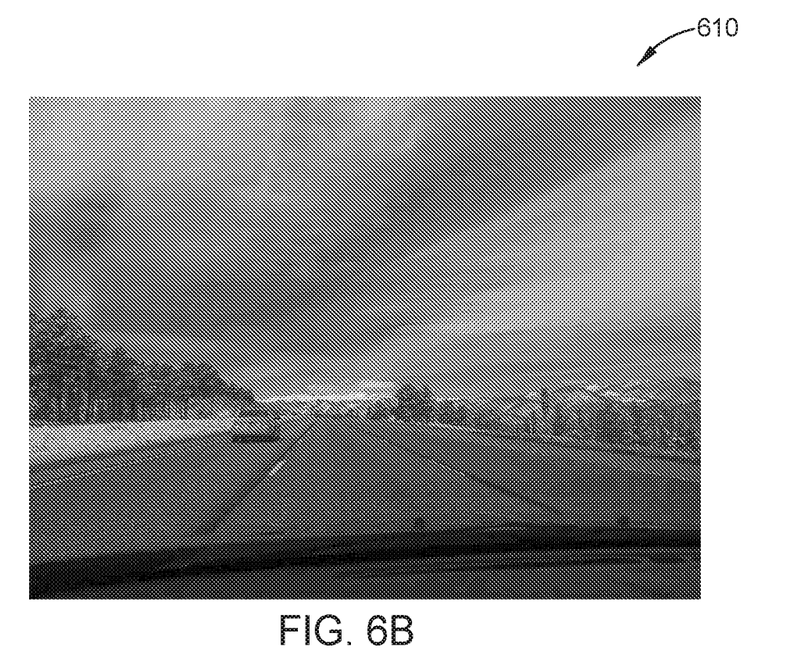
Figure 7A:
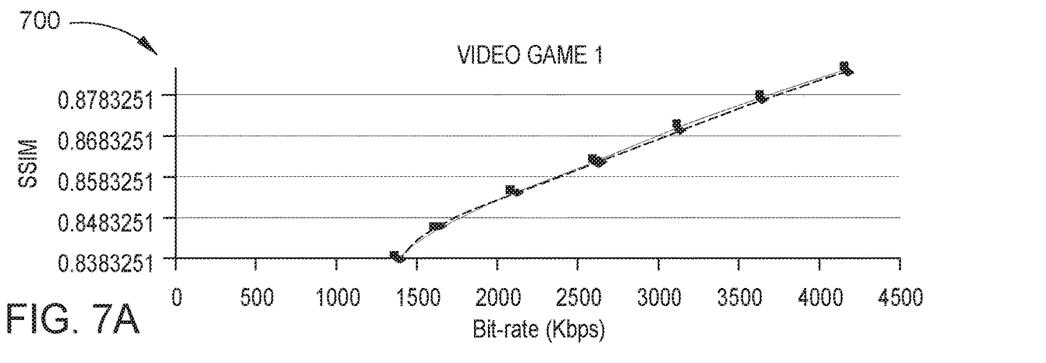
Figure 7B:
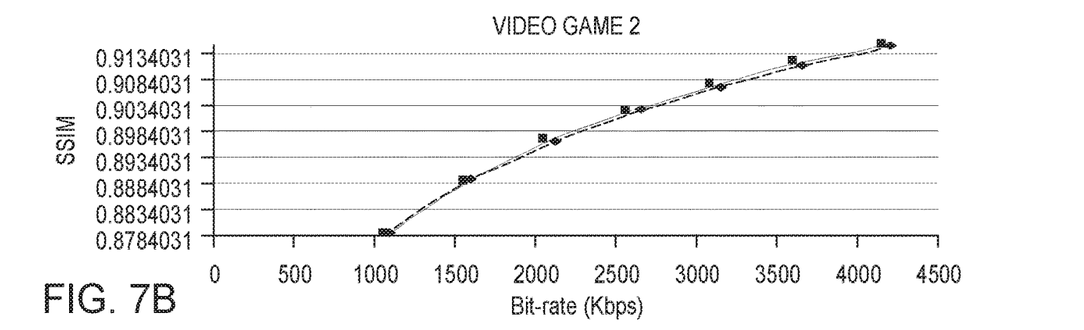
Figure 7C:
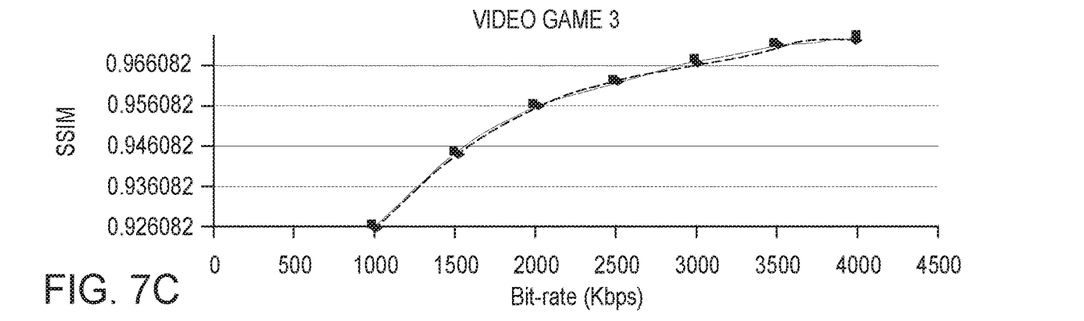
Figure 7D:
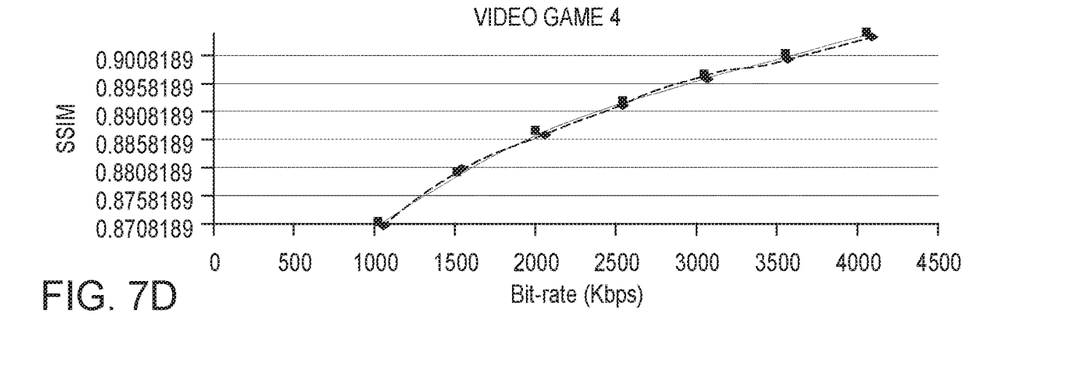
Figure 7E:
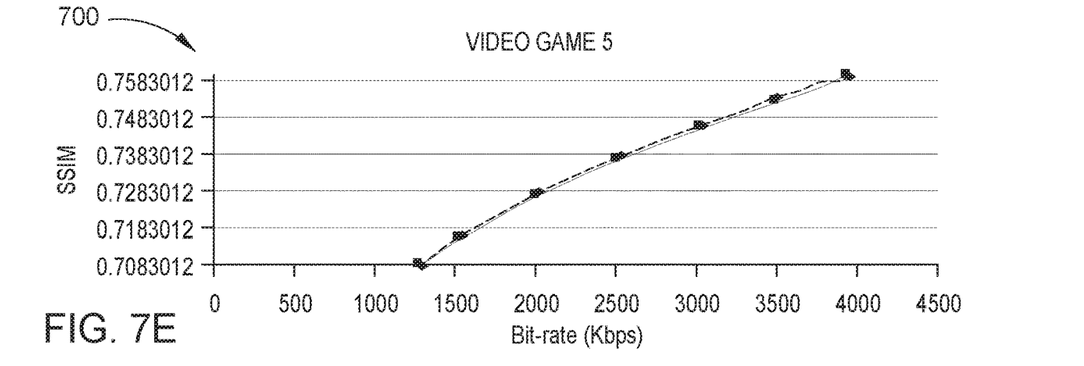
Figure 7F:
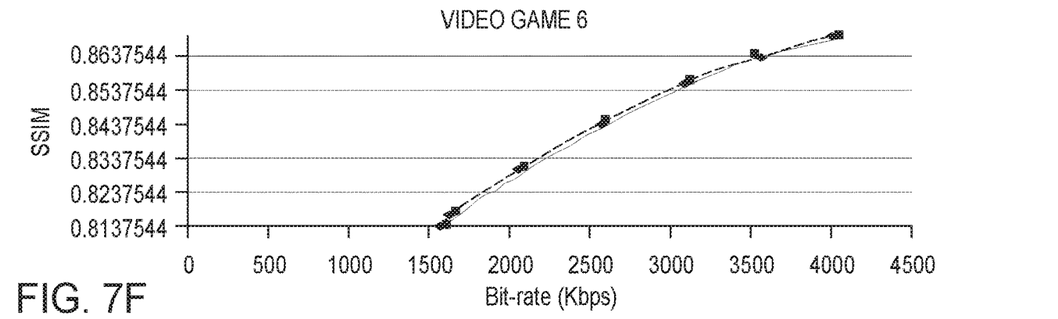
Figure 7G:
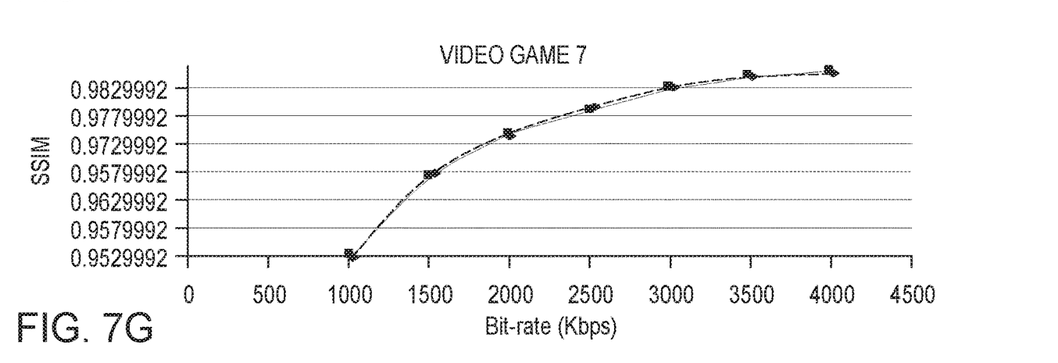
Figure 7H:
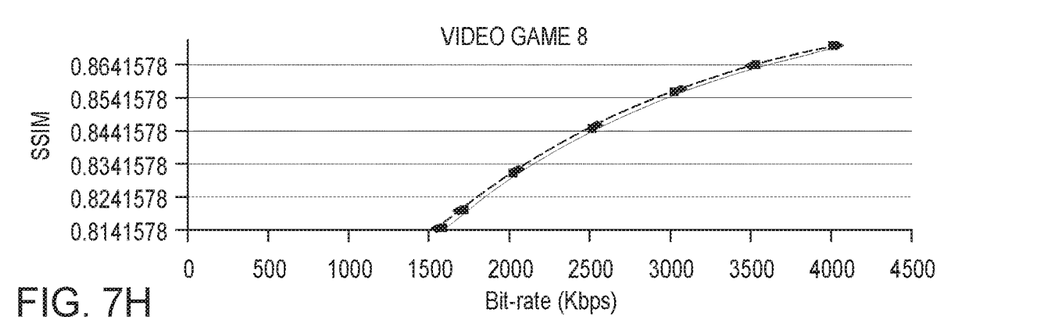
Figure 7I:
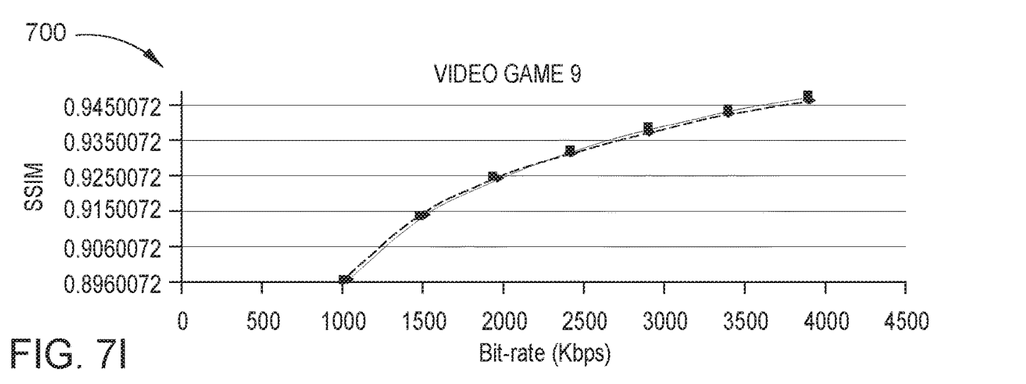
Figure 7J:
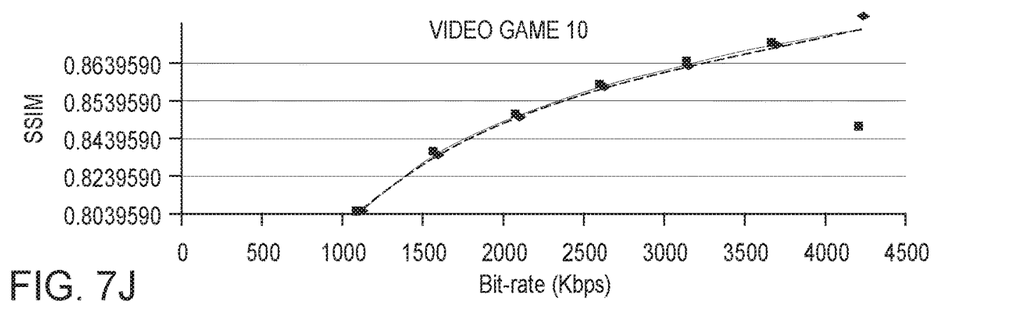
Figure 7K:
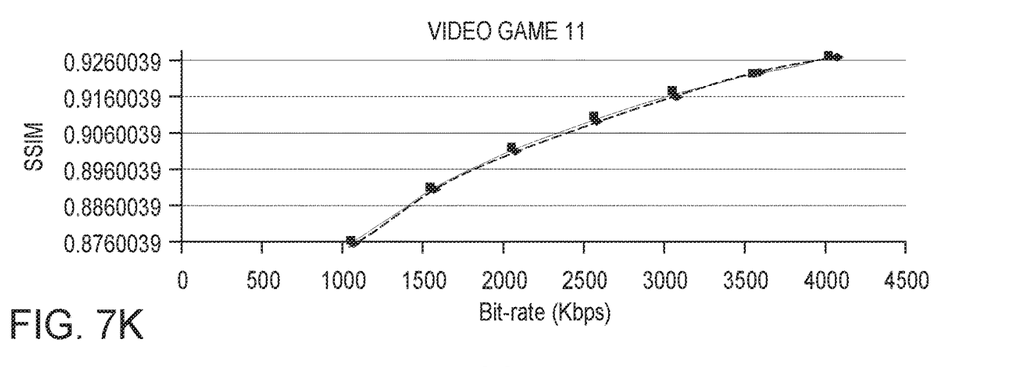
Figure 7L:
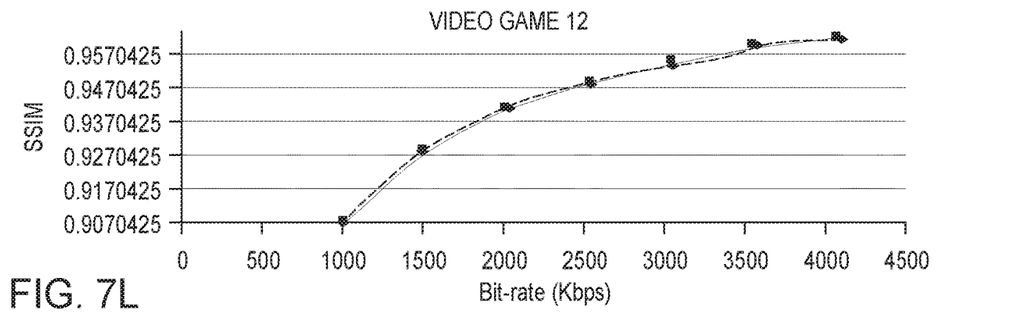

FIGS. 6a and 6b are screenshots 600, 610 of a video frame with and without blocking artifacts, according to embodiments of the present disclosure. FIG. 6a is a reproduction of FIG. 4 to provide a contrast in the video frame image to FIG. 6b, which illustrates the same video frame image without blocking artifacts. As illustrated in FIG. 6b, by employing the method disclosed herein, the video encoder using the disclosed techniques has removed and prevented blocking artifacts in the video encoding, especially in areas of the video frame where the variance is high but bit-budgets are low.

The method discussed herein removes blocking artifacts from the streams. FIG. 6a shows an impacted frame with blocking artifacts, and FIG. 6b shows the blocks using intra prediction mode that resulted in blocking artifacts getting coded as Inter prediction mode and thus appears without the blocking artifacts. Also, for Intra prediction mode blocks, which do not have blocking artifacts and did not satisfy the condition VBR>ThresholdVB, the video encoder using the disclosed techniques does not affect these blocks. Accordingly, their prediction mode selection is not impacted and they continue to be coded with Intra prediction mode.

FIG. 7A-L illustrates different graphs 700 of BD-rates from different video games after removal of blocking artifacts from video frames, such as the game illustrated in FIGS. 6a and 6b, according to embodiments of the present disclosure.

In certain embodiments, computational complexity of the method disclosed herein is very minimal in comparison to the overall complexity of video encoding. In one embodiment, the impact on objective quality measure in BD-rate metric is 0.22% loss. In one embodiment, a BD-rate loss of 0.22% is acceptable given the videos are visually more appealing and do not include blocking artifacts. The BD-rate curves for 12 different gaming sequences are shown in FIG. 8.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method, comprising:
    retrieving a first video frame comprising a plurality of pixel blocks;
    determining a rate distortion optimization (RDO) cost for a first prediction mode for a pixel block;
    determining a variance-bits ratio (VBR) of the pixel block, wherein the VBR of the pixel block is a ratio between variance of source pixels in the pixel block and bits for coding the pixel block with the first prediction mode;
    upon determining the VBR is greater than a predefined threshold, scaling the RDO cost for the first prediction mode by scaling a distortion factor of the RDO cost based on a predefined scale factor; and
    selecting one of the first prediction mode and a second prediction mode for video encoding of the first video frame based on comparing the scaled RDO cost for the first prediction mode and a second RDO cost for the second prediction mode for the pixel block.

2. The method of claim 1, wherein the first prediction mode is an intra prediction mode and the second prediction mode is an inter prediction mode.

3. The method of claim 2, wherein the intra prediction mode involves prediction between pixels of the pixel block of the first frame.

4. The method of claim 2, wherein the inter prediction mode involves prediction from a first plurality of pixels of the first pixel block of the first frame to a second plurality of pixels of a second pixel block of a reference frame.

5. The method of claim 1, wherein the scale factor is greater than 1.

6. The method of claim 1, wherein the predefined threshold is a function of a quantization parameter for the pixel block.

7. The method of claim 1, wherein the variance of the source pixels comprises a measurement of texture information in the pixel block.

8. The method of claim 1, wherein the bits for coding the pixel block using the first prediction mode comprises bits taken to encode residue coefficients and mode bits.

9. A system comprising:
    a processor; and
    a memory comprising a computer program for video encoding, the computer program, when executed by the processor, performs an operation, the operating comprising:
        retrieving a first video frame comprising a plurality of pixel blocks;
        determining a rate distortion optimization (RDO) cost for a first prediction mode for a pixel block;
        determining a variance-bits ratio (VBR) of the pixel block, wherein the VBR of the pixel block is a ratio between variance of source pixels in the pixel block and bits for coding the pixel block with the first prediction mode;

upon determining the VBR is greater than a predefined threshold, scaling the RDO cost for the first prediction mode by scaling a distortion factor of the RDO cost based on a predefined scale factor; and selecting one of the first prediction mode and a second prediction mode for video encoding of the first video frame based on comparing the scaled RDO cost for the first prediction mode and a second RDO cost for the second prediction mode for the pixel block.

10. The system of claim 9, wherein the first prediction mode is an intra prediction mode and the second prediction mode is an inter prediction mode.

11. The system of claim 10, wherein the intra prediction mode involves prediction between pixels of the pixel block of the first frame.

12. The system of claim 10, wherein the inter prediction mode involves prediction from a first plurality of pixels of the first pixel block of the first frame to a second plurality of pixels of a second pixel block of a reference frame.

13. The system of claim 9, wherein the scale factor is greater than 1.

14. The system of claim 9, wherein the predefined threshold is a function of a quantization parameter for the pixel block.

15. The system of claim 9, wherein the variance of the source pixels comprises a measurement of texture information in the pixel block.

16. The system of claim 9, wherein the bits for coding the pixel block using the first prediction mode comprises bits taken to encode residue coefficients and mode bits.

17. A non-transitory computer-readable medium embodying computer program instructions for video encoding, the computer program instructions implementing a method, the method comprising:

retrieving a first video frame comprising a plurality of pixel blocks;

determining a rate distortion optimization (RDO) cost for a first prediction mode for a pixel block;

determining a variance-bits ratio (VBR) of the pixel block, wherein the VBR of the pixel block is a ratio between variance of source pixels in the pixel block and bits for coding the pixel block with the first prediction mode;

upon determining the VBR is greater than a predefined threshold, scaling the RDO cost for the first prediction mode by scaling a distortion factor of the RDO cost based on a predefined scale factor; and selecting one of the first prediction mode and a second prediction mode for video encoding of the first video frame based on comparing the scaled RDO cost for the first prediction mode and a second RDO cost for the second prediction mode for the pixel block.

18. The non-transitory computer-readable medium of claim 17, wherein the predefined threshold is a function of a quantization parameter for the pixel block.

19. The method of claim 1, wherein the variance of the source pixels in the pixel block is a measurement of differences between pixel values of the source pixels in the pixel block.

20. The system of claim 9, wherein the variance of the source pixels in the pixel block is a measurement of differences between pixel values of the source pixels in the pixel block.

* * * * *